(12) United States Patent
Mathur

(10) Patent No.: US 8,619,291 B2
(45) Date of Patent: Dec. 31, 2013

(54) SYSTEM AND METHOD FOR CONTROL OF DOCUMENT PROCESSING DEVICES VIA A REMOTE DEVICE INTERFACE

(75) Inventor: Alok Mathur, Rancho Santa, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 747 days.

(21) Appl. No.: 12/830,590

(22) Filed: Jul. 6, 2010

(65) Prior Publication Data
US 2011/0080613 A1  Apr. 7, 2011

Related U.S. Application Data

(60) Provisional application No. 61/249,409, filed on Oct. 7, 2009.

(51) Int. Cl.
| | |
|---|---|
| *G06F 3/12* | (2006.01) |
| *G06K 15/00* | (2006.01) |
| *H04N 1/60* | (2006.01) |
| *H04N 1/46* | (2006.01) |

(52) U.S. Cl.
USPC ......... 358/1.15; 358/1.1; 358/1.13; 358/1.14; 358/1.9; 358/534; 455/66.1; 455/41.3; 455/456.3; 345/519; 715/766

(58) Field of Classification Search
None
See application file for complete search history.

(56) References Cited

U.S. PATENT DOCUMENTS

| | | | | |
|---|---|---|---|---|
| 7,667,707 | B1 * | 2/2010 | Margulis | 345/519 |
| 8,068,240 | B2 * | 11/2011 | Shiohara et al. | 358/1.13 |
| 2002/0036796 | A1 * | 3/2002 | Kurozasa et al. | 358/1.15 |
| 2004/0048621 | A1 * | 3/2004 | Takahashi et al. | 455/456.3 |
| 2005/0213151 | A1 * | 9/2005 | Yajima et al. | 358/1.15 |
| 2005/0243359 | A1 * | 11/2005 | Watanabe | 358/1.13 |
| 2007/0164855 | A1 * | 7/2007 | Takahashi et al. | 340/531 |
| 2008/0051032 | A1 * | 2/2008 | Hashimoto | 455/41.3 |
| 2008/0051034 | A1 * | 2/2008 | Hashimoto | 455/66.1 |
| 2008/0062484 | A1 * | 3/2008 | Moriya et al. | 358/534 |
| 2008/0320406 | A1 * | 12/2008 | Fukada et al. | 715/766 |
| 2012/0069132 | A1 * | 3/2012 | Kato | 348/14.02 |
| 2013/0070297 | A1 * | 3/2013 | Kato | 358/1.15 |

* cited by examiner

*Primary Examiner* — Satwant Singh
(74) *Attorney, Agent, or Firm* — SoCal IP Law Group LLP; Steven C. Sereboff; Jonathan Pearce

(57) ABSTRACT

The subject application is directed to a system and method for controlling a document processing device via a remote device interface. Display data is generated corresponding to the control of the document processing device, following which instructions are received from a user corresponding to one or more document processing operations. An image is then generated on a display integrated in the document processing device based on the display data and the received instructions. The display data is then communicated, via an established data connection, to an associated data processing device having both a user data input and a user display. Control instructions for the document processing device are then received from the associated data processing device so as to allow for user control of a document processing operation and a document processing operation is commenced based on instructions received from the data processing device.

15 Claims, 12 Drawing Sheets

SYSTEM AND METHOD FOR CONTROL OF DOCUMENT PROCESSING DEVICES VIA A REMOTE DEVICE INTERFACE

CROSS-REFERENCE TO RELATED APPLICATIONS

This application claims priority to U.S. Provisional Patent Application Ser. No. 61/249,409, filed on Oct. 7, 2009 titled "MFP UI BASED ON CLIENT PREFERENCES FROM MFP DEVICES", the entirety of which is incorporated herein.

BACKGROUND OF THE INVENTION

The subject application is directed generally to secondary control for document processing devices from devices other than an integrated control panel. The application is particularly directed to control of document processing devices via secondary devices that include their own displays and key data entry system.

Modern document processing devices include copiers, printers, e-mail gateways, facsimile machines, and scanners. Many devices include two or more of these functions, and are referred to as multifunction peripherals (MFPs) or multifunction devices (MFDs). Document processing devices, particularly MFPs, often include embedded computers, referred to as controllers, to perform functions such as device control, data communication, user interface generation, device maintenance, and checking of device status.

Document processing devices typically rely on integrated user interfaces to allow users to view device options and select desired operations. The display is typically generated by the integrated controller, which also serves to receive user instructions and control the document processing device to complete the desired operations. User interfaces may include a keyboard and display, a mouse or other cursor control, a touch screen, or any other suitable man-machine interface. This interface allows a user to select one or more operations, such as printing, copying, scanning, faxing, e-mailing, and the like. The interface also allows for input of a destination, such as fax or network destinations. Additionally, a user can select options such as a number of copies, document finishing options, such as hole punching, collation or stapling. Since a document processing device typically has a single control interface, operation by users is typically relegated to one user who has control of the interface at a given time.

SUMMARY OF THE INVENTION

In accordance with one embodiment of the subject application, there is provided a system and method for controlling a document processing device via a remote device interface. Display data is generated, via a controller which includes a processor and associated data storage, corresponding to control of the document processing device. Instructions are received from an associated user corresponding to at least one document processing operation corresponding to display data. An image is generated on a display integrated in the document processing device in accordance with the display data and the received instructions. A data connection is established with an associated data processing device including a user data input and a user display. The display data is communicated to the data processing device. Control instructions for document processing device are received from the associated data processing device so as to allow for user control of a document processing operation and a document processing operation is commenced in accordance with received instructions from the associated data processing device.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for controlling a document processing device via a remote device interface. The subject application is directed to secondary control for document processing devices from devices other than an integrated control panel. The application is particularly directed to control of document processing devices via secondary devices that include their own displays and key data entry system. It will become apparent to those skilled in the art that the system and method described herein are suitably adapted to a plurality of varying electronic fields employing portable telecommunication devices, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
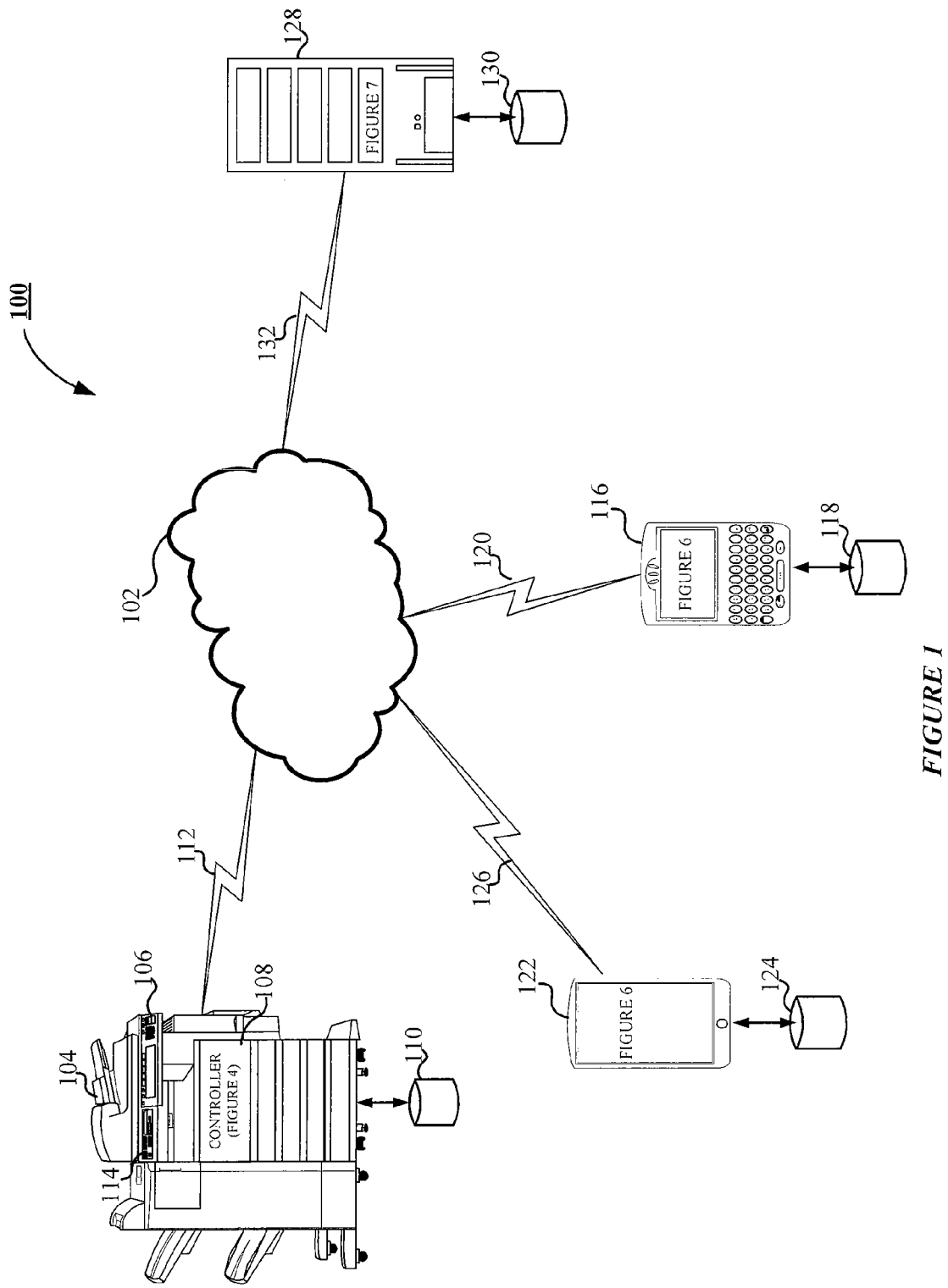
FIG. 1 is an overall diagram of a system for controlling a document processing device via a remote device interface according to one embodiment of the subject application.

Referring now to FIG. 1, there is shown an overall diagram of a type of system 100 for controlling a document processing device via a remote device interface in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touchscreen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as the controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. The functioning of the document processing device 104 will be better understood in conjunction with the block diagrams illustrated in FIGS. 2 and 3, explained in greater detail below.

In accordance with one embodiment of the subject application, the document processing device 104 incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 is capable of being performed by any general purpose computing system, known in the art, and thus the controller 108 is representative of such general computing devices and is intended as such when used hereinafter. Furthermore, the use of the controller 108 hereinafter is for the example embodiment only, and other embodiments, which will be apparent to one skilled in the art, are capable of employing the system and method for obtaining address data from a portable device to a document processing device. The functioning of the controller 108 will better be understood in conjunction with the block diagrams illustrated in FIGS. 4 and 5, explained in greater detail below.

Communicatively coupled to the document processing device 104 is a data storage device 110. In accordance with the one embodiment of the subject application, the data storage device 110 is any mass storage device known in the art including, for example and without limitation, magnetic storage drives, a hard disk drive, optical storage devices, flash memory devices, or any suitable combination thereof. In one embodiment, the data storage device 110 is suitably adapted to store scanned image data, modified image data, redacted data, user information, document data, image data, electronic database data, or the like. It will be appreciated by those skilled in the art that while illustrated in FIG. 1 as being a separate component of the system 100, the data storage device 110 is capable of being implemented as an internal storage component of the document processing device 104, a component of the controller 108, or the like, such as, for example and without limitation, an internal hard disk drive, or the like. In accordance with one embodiment of the subject application, the data storage device 110 is capable of storing document processing instructions, usage data, user interface data, job control data, controller status data, component execution data, images, advertisements, user information, location information, output templates, mapping data, multimedia data files, fonts, and the like. The document processing device of FIG. 1 also includes a portable storage device reader 114, which is suitably adapted to receive and access a myriad of different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

Also depicted in FIG. 1 is a plurality of user devices, illustrated as portable telecommunications devices 116 and 122. Each portable telecommunications device 116 and 122 is preferably in data communication with the document processing device 104 via corresponding communications links 120 and 126. It will be appreciated by those skilled in the art that the portable telecommunication devices 116 and 122 are shown in FIG. 1 as a smart cellular telephone and a portable electronic book reading device for illustration purposes only. As will be understood by those skilled in the art, the portable telecommunication devices 116 and 122 are representative of any personal computing device known in the art including, for example and without limitation, a laptop computer, a personal computer, a personal data assistant, a web-enabled cellular telephone, a smart phone, a proprietary network device, or other web-enabled electronic device. According to one embodiment of the subject application, the portable telecommunication devices 116 and 122 further include software, hardware, or a suitable combination thereof configured to interact with the document processing device 104 or the like. Preferably, each portable telecommunication device 116 and 122 includes a suitable personal area network interface, such as a BLUETOOTH transceiver, an RF transceiver, and the like.

The communications links 120 and 126 are any suitable channel of data communications known in the art including, but not limited to wireless communications, for example and without limitation, BLUETOOTH, WiMax, 802.11a, 802.11b, 802.11g, 802.11(x), a proprietary communications channel, infrared, optical, the public switched telephone network, or any suitable wireless data transmission system, or wired communications known in the art. Preferably, the portable telecommunication devices 116 and 122 are suitably adapted to provide contact information, address book data, document data, job data, user interface data, image data, monitor document processing jobs, employ thin-client interfaces, generate display data, generate output data, or the like, with respect to the document processing device 104, or any other similar device with which the portable telecommunication devices 116 and 122 are capable of communicating. According to one embodiment of the subject application, the portable telecommunication devices 116 and 122 are capable of implementing various graphical user interface applications for interacting with a user, as will be appreciated by those skilled in the art to include a physical keyboard, a soft keyboard via an associated touch screen interface, or a suitable combination thereof. The functioning of the portable telecommunication devices 116 and 122 will better be understood in conjunction with the block diagram illustrated in FIG. 6, explained in greater detail below.

Communicatively coupled to the portable telecommunication devices 116 and 122 are data storage devices 118 and 124, respectively. According to the foregoing example embodiment, the data storage devices 118 and 124 are any mass storage device, or plurality of such devices, known in the art including, for example and without limitation, magnetic storage drives, a hard disk drive, optical storage devices, flash memory devices, or any suitable combination thereof. In such an embodiment, the data storage devices 118 and 124 are suitably adapted to store operating systems, address book data, personal information, account information, identification data, regional data, thin client interface data, keyboard layout data, keyboard property data, HTML keyboard data, JavaScript keyboard data, update software, policy information, and the like.

It will be appreciated by those skilled in the art that while illustrated in FIG. 1 as being a separate component of the system 100, the data storage devices 118 and 124 are capable of being implemented as an internal storage component of the portable telecommunication devices 116 and 122.

The system 100 illustrated in FIG. 1 further depicts a backend component, shown as the server 128, in data communication with the computer network 102 via a communications link 132. It will be appreciated by those skilled in the art that the server 128 is shown in FIG. 1 as a component of the system 100 for example purposes only, and the subject application is capable of implementation without the use of a separate backend server component, e.g. the server 128 is capable of implementation via the document processing device 104, or via one of a plurality of portable devices 116 and 122. The skilled artisan will appreciate that the server 128 comprises hardware, software, and combinations thereof suitably adapted to provide one or more services, web-based applications, communication with thin client interfaces, storage options, and the like, to networked devices. In accordance with one example embodiment of the subject application, the server 128 includes various components, implemented as hardware, software, or a combination thereof, for managing retention of secured documents, text data, performing searches, comparisons, maintaining database entries, account information, receiving payment data, retrieval of documents, and the like, which are accessed via the computer network 102.

The communications link 132 is any suitable data communications means known in the art including, but not limited to wireless communications comprising, for example and without limitation Bluetooth, WiMax, 802.11a, 802.11b, 802.11g, 802.11(x), a proprietary communications network, infrared, the public switched telephone network, optical, or any suitable wireless data transmission system, or wired communications known in the art. It will further be appreciated by those skilled in the art that the components described with respect to the server 128 are capable of implementation on any suitable computing device coupled to the computer network 102, e.g. the controller 108, or the like. The functioning of the server 128 will better be understood in conjunction with the block diagram illustrated in FIG. 7, explained in greater detail below.

Communicatively coupled to the server 128 is the data storage device 130. According to the foregoing example embodiment, the data storage device 130 is any mass storage device, or plurality of such devices, known in the art including, for example and without limitation, magnetic storage drives, a hard disk drive, optical storage devices, flash memory devices, or any suitable combination thereof. In such an embodiment, the data storage device 130 is suitably adapted to store account information, document processing device identification data, client device identification data, regional data, thin client interface data, keyboard layout data, keyboard property data, HTML keyboard data, JavaScript keyboard data, update software, policy information, and the like. It will be appreciated by those skilled in the art that while illustrated in FIG. 1 as being a separate component of the system 100, the data storage device 130 is capable of being implemented as an internal storage component of the server 130, or the like, such as, for example and without limitation, an internal hard disk drive, or the like.

Figure 2:
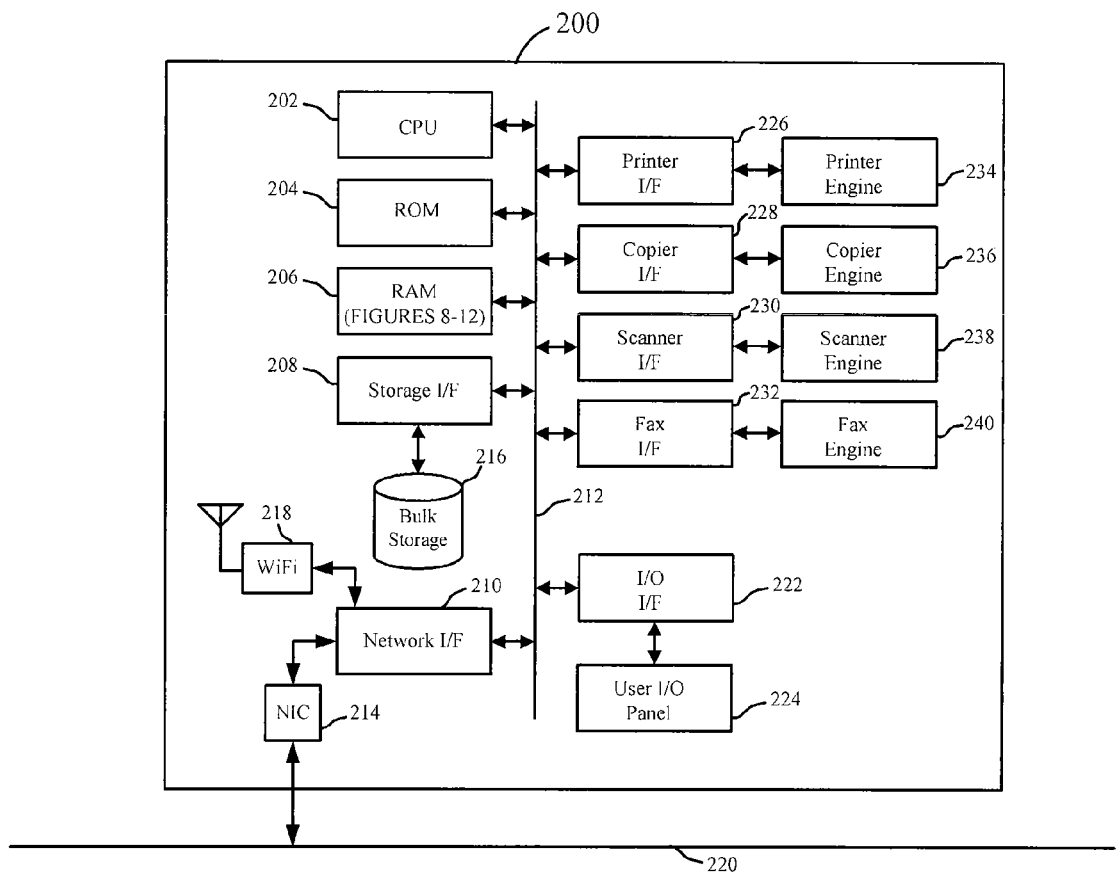
FIG. 2 is a block diagram illustrating device hardware for use in the system for controlling a document processing device via a remote device interface according to one embodiment of the subject application.

Turning now to FIG. 2, illustrated is a representative architecture of a suitable device 200, shown in FIG. 1 as the document processing device 104, on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by the bus 212.

Suitable executable instructions on the device 200 facilitate communication with a plurality of external devices, such as workstations, document rendering devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
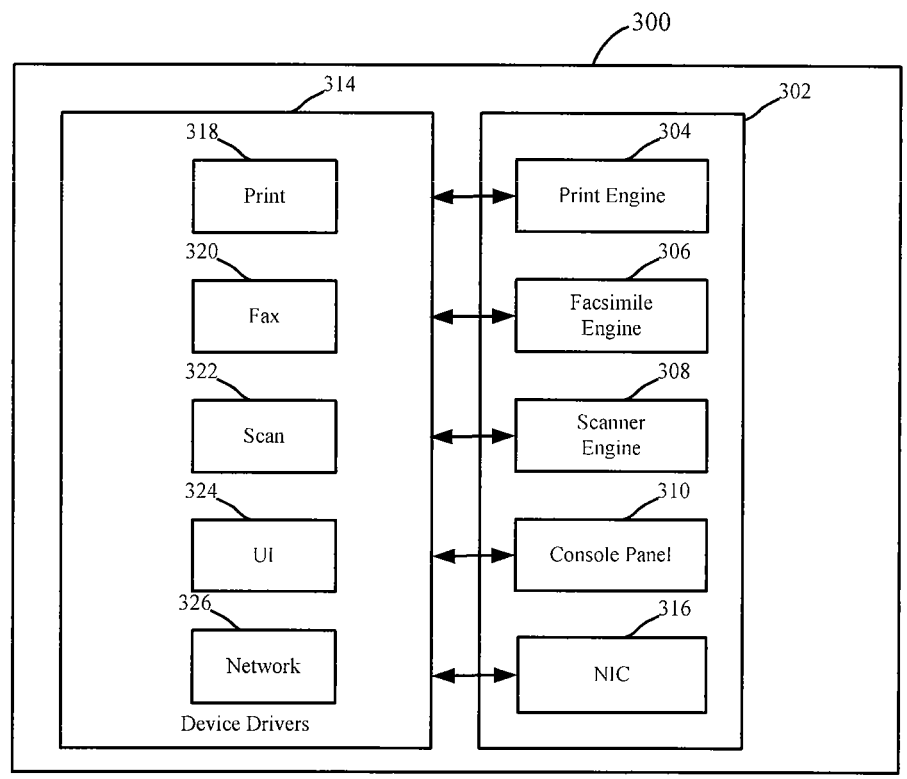
FIG. 3 is a functional diagram illustrating the device for use in the system for controlling a document processing device via a remote device interface according to one embodiment of the subject application.

Turning now to FIG. 3, illustrated is a suitable document processing device, depicted in FIG. 1 as the document processing device 104, for use in connection with the disclosed system. FIG. 3 illustrates suitable functionality of the hardware of FIG. 2 in connection with software and operating system functionality as will be appreciated by one of ordinary skill in the art. The document rendering device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
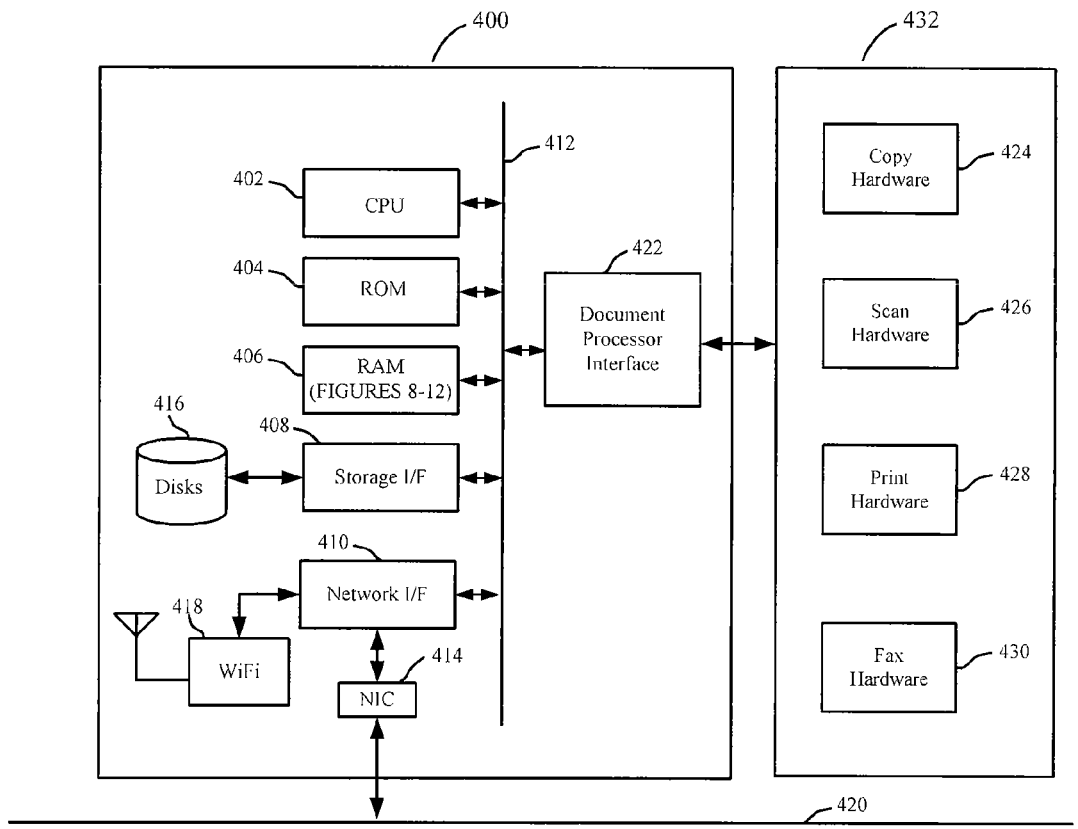
FIG. 4 is a block diagram illustrating controller hardware for use in the system for controlling a document processing device via a remote device interface according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
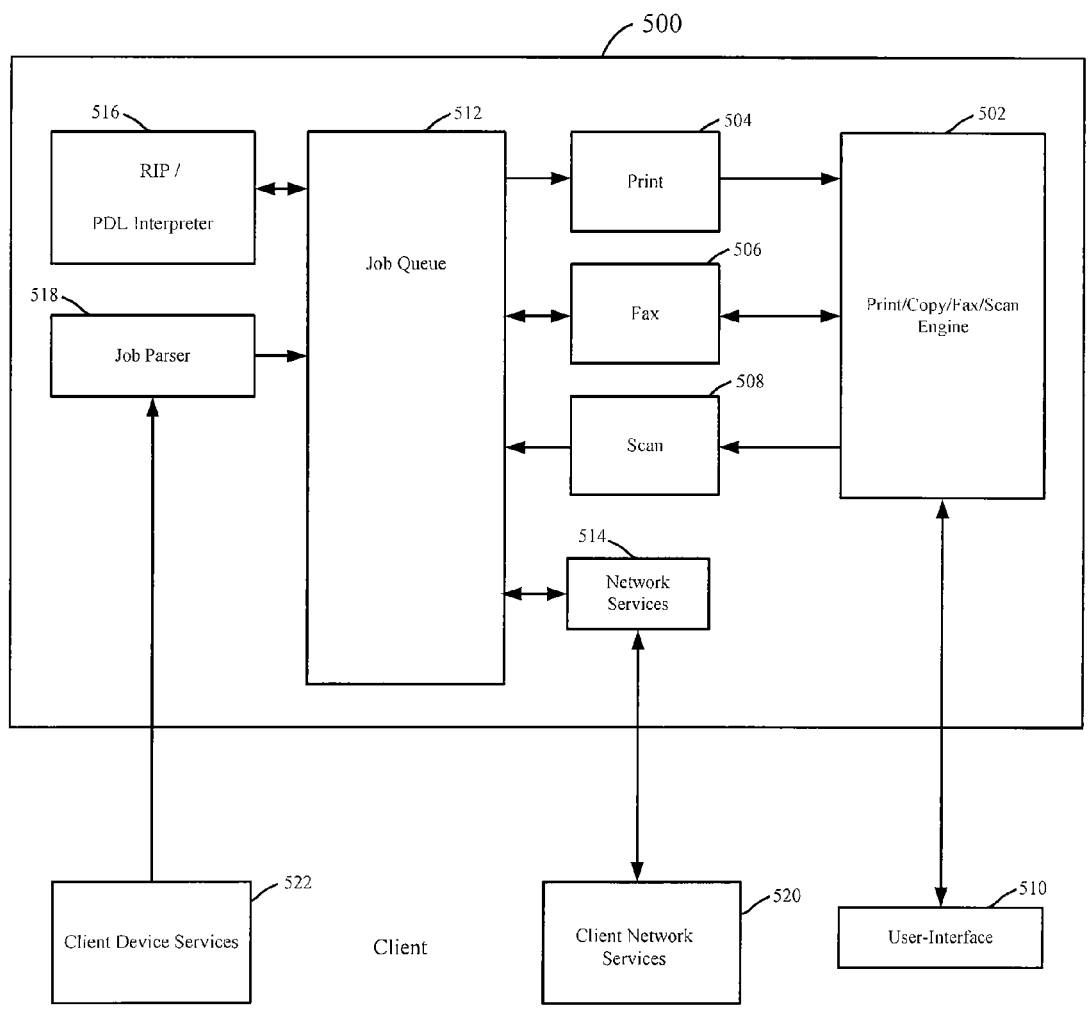
FIG. 5 is a functional diagram illustrating the controller for use in the system for controlling a document processing device via a remote device interface according to one embodiment of the subject application.

Functionality of the subject system 100 is accomplished on a suitable document rendering device, such as the document processing device 104, which includes the controller 400 of FIG. 4, (shown in FIG. 1 as the controller 108) as an intelligent subsystem associated with a document rendering device. In the illustration of FIG. 5, controller function 500 in the preferred embodiment includes a document processing engine 502. A suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document rendering devices that perform one or more of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 308 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
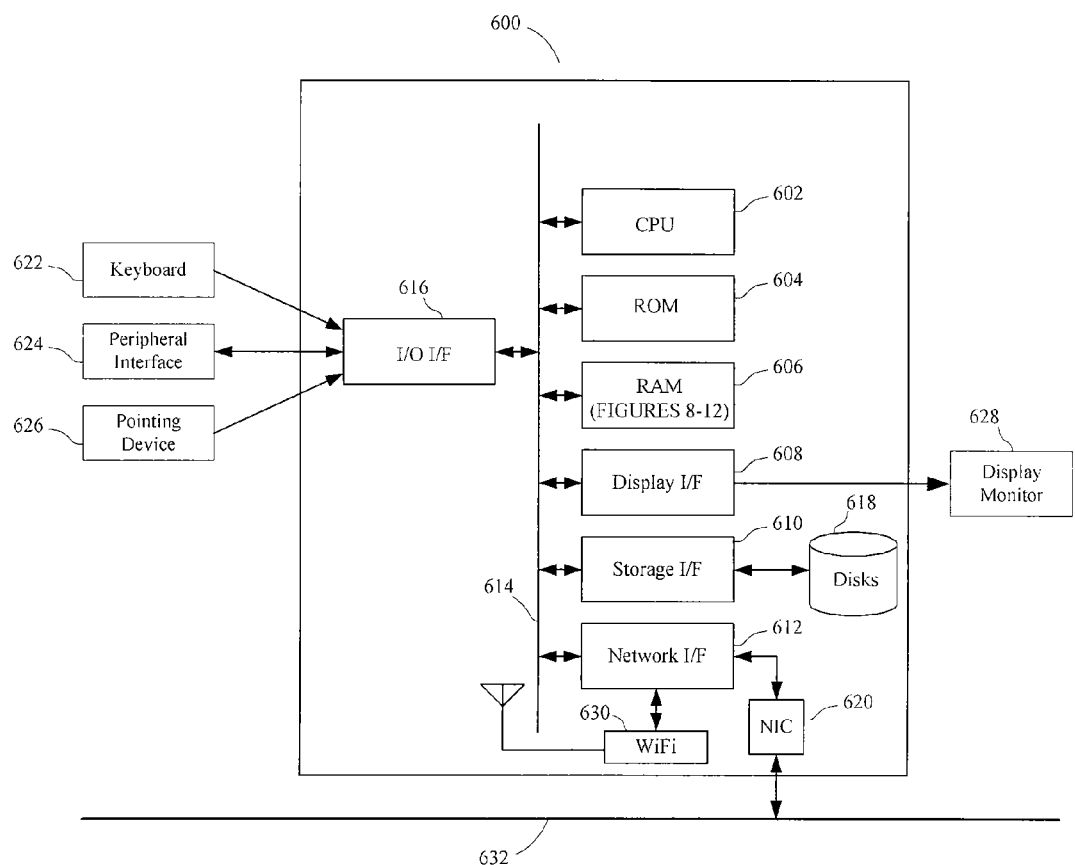
FIG. 6 is a block diagram illustrating a workstation for controlling a document processing device via a remote device interface according to one embodiment of the subject application.

Turning now to FIG. 6, illustrated is a hardware diagram of a suitable workstation 600, shown in FIG. 1 as the portable telecommunication devices 116 and 122 or the workstation 128, for use in connection with the subject system. A suitable workstation includes a processor unit 602 which is advantageously placed in data communication with read only memory 604, suitably non-volatile read only memory, volatile read only memory or a combination thereof, random access memory 606, display interface 608, storage interface 610, and network interface 612. In a preferred embodiment, interface to the foregoing modules is suitably accomplished via a bus 614.

The read only memory 604 suitably includes firmware, such as static data or fixed instructions, such as BIOS, system functions, configuration data, and other routines used for operation of the workstation 600 via CPU 602.

The random access memory 606 provides a storage area for data and instructions associated with applications and data handling accomplished by the processor 602.

The display interface 608 receives data or instructions from other components on the bus 614, which data is specific to generating a display to facilitate a user interface. The display interface 608 suitably provides output to a display terminal 628, suitably a video display device such as a monitor, LCD, plasma, or any other suitable visual output device as will be appreciated by one of ordinary skill in the art.

The storage interface 610 suitably provides a mechanism for non-volatile, bulk or long term storage of data or instructions in the workstation 600. The storage interface 610 suitably uses a storage mechanism, such as storage 618, suitably comprised of a disk, tape, CD, DVD, or other relatively higher capacity addressable or serial storage medium.

The network interface 612 suitably communicates to at least one other network interface, shown as network interface 620, such as a network interface card, and wireless network interface 630, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 620 is interconnected for data interchange via a physical network 632, suitably comprised of a local area network, wide area network, or a combination thereof.

An input/output interface 616 in data communication with the bus 614 is suitably connected with an input device 622, such as a keyboard or the like. The input/output interface 616 also suitably provides data output to a peripheral interface 624, such as a USB, universal serial bus output, SCSI, Firewire (IEEE 1394) output, or any other interface as may be appropriate for a selected application. Finally, the input/output interface 616 is suitably in data communication with a pointing device interface 626 for connection with devices, such as a mouse, light pen, touch screen, or the like.

Figure 7:
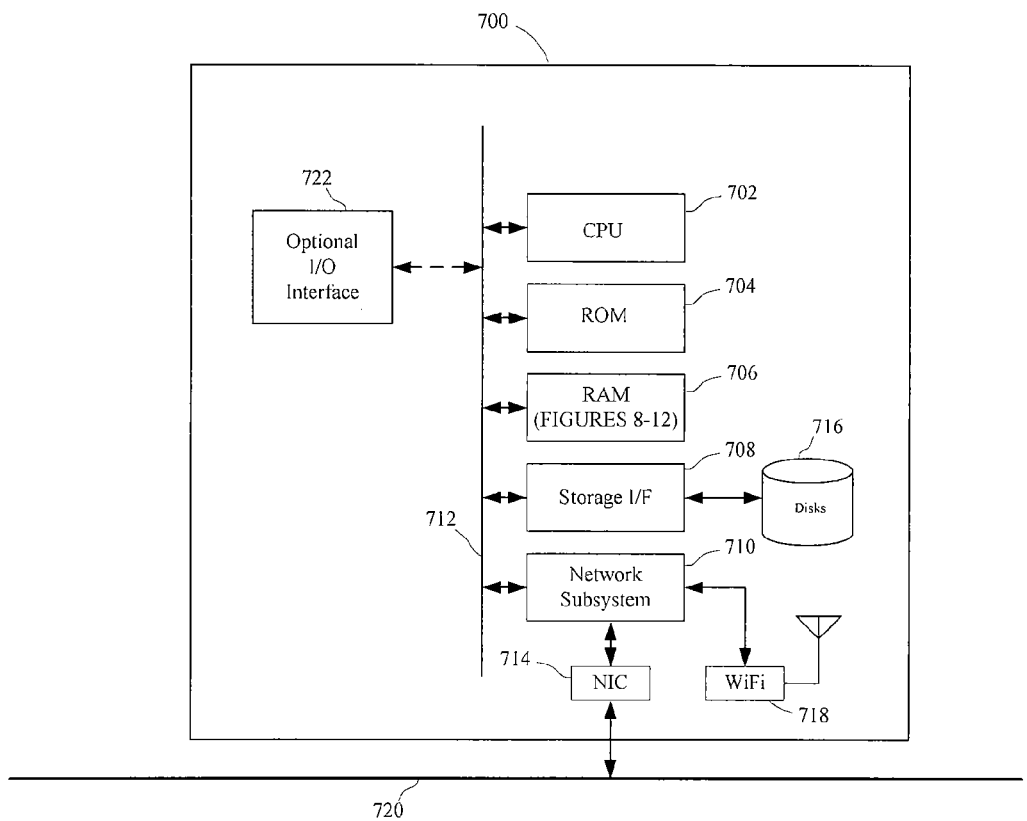
FIG. 7 is a block diagram illustrating a server for controlling a document processing device via a remote device interface according to one embodiment of the subject application.

Turning now to FIG. 7, illustrated is a representative architecture of a suitable server 700 (depicted in FIG. 1 as the server 128), on which operations of the subject system are completed. Included is a processor 702, suitably comprised of a central processor unit. However, it will be appreciated that processor 702 may advantageously be composed of multiple processors working in concert with one another as will be appreciated by one of ordinary skill in the art. Also included is a non-volatile or read only memory 704 which is advantageously used for static or fixed data or instructions, such as BIOS functions, system functions, system configuration, and other routines or data used for operation of the server 700.

Also included in the server 700 is random access memory 706, suitably formed of dynamic random access memory, static random access memory, or any other suitable, addressable memory system. Random access memory provides a storage area for data instructions associated with applications and data handling accomplished by the processor 702.

A storage interface 708 suitably provides a mechanism for volatile, bulk or long term storage of data associated with the server 700. The storage interface 708 suitably uses bulk storage, such as any suitable addressable or serial storage, such as a disk, optical, tape drive and the like as shown as 716, as well as any suitable storage medium as will be appreciated by one of ordinary skill in the art.

A network interface subsystem 710 suitably routes input and output from an associated network allowing the server 700 to communicate to other devices. The network interface subsystem 710 suitably interfaces with one or more connections with external devices to the server 700. By way of example, illustrated is at least one network interface card 714 for data communication with fixed or wired networks, such as Ethernet, token ring, and the like, and a wireless interface 718, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 714 is interconnected for data interchange via a physical network 720, suitably comprised of a local area network, wide area network, or a combination thereof.

Data communication between the processor 702, read only memory 704, random access memory 706, storage interface 708 and the network subsystem 710 is suitably accomplished via a bus data transfer mechanism, such as illustrated by bus 712.

Figure 8:
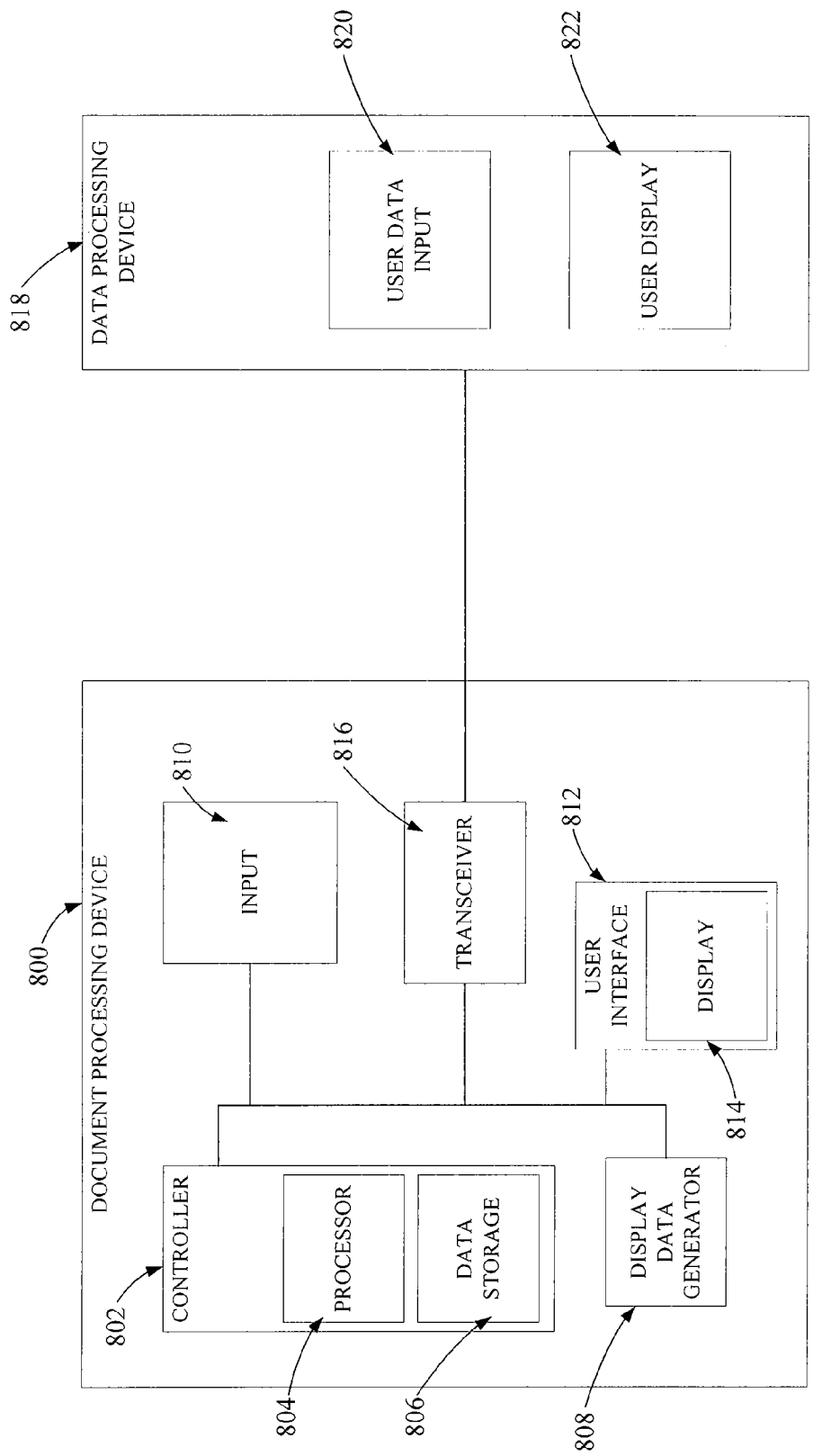
FIG. 8 is a block diagram illustrating the system for controlling a document processing device via a remote device interface according to one embodiment of the subject application.

Suitable executable instructions on the server 700 facilitate communication with a plurality of external devices, such as workstations, document processing devices, other servers, or the like. While, in operation, a typical server operates autonomously, it is to be appreciated that direct control by a local user is sometimes desirable, and is suitably accomplished via an optional input/output interface 722 as will be appreciated by one of ordinary skill in the art Referring now to FIG. 8, illustrated is a block diagram of a document processing device system 800 in accordance with one embodiment of the subject application. The document processing device 800 of FIG. 8 includes a controller 802 that has a processor 804 and an associated data storage 806. The document processing device 800 further includes a display data generator 808 that is capable of generating display data that corresponds to the control of the document processing device 800. The document processing device 800 also incorporates an input 810 that is configured to receive instructions from an associated user. Preferably, the instructions correspond to one or more document processing operations which correspond to display data.

Also included in the document processing device 800 are a user interface 812 and a transceiver 816. According to one embodiment of the subject application, the user interface 812 includes a display 814 that is integrated in the document processing device 800 and is operable in conjunction with the display data and the input 810. The transceiver 816 is configured to establish a data connection with an associated data processing device 818. The data processing device 818, in accordance with one embodiment of the subject application, includes a user data input 820 and a user display 822. Preferably, the transceiver 816 is further capable of communicating the display data to the data processing device 818 and to receive the instructions from the data processing device 818 so as to allow for user control of a document processing operation via the associated data processing device 818 alternatively to the user interface 812. The controller 802 of the document processing device 800 is preferably configured to commence a document processing operation based upon received instructions from the associated data processing device 818.

Figure 9:
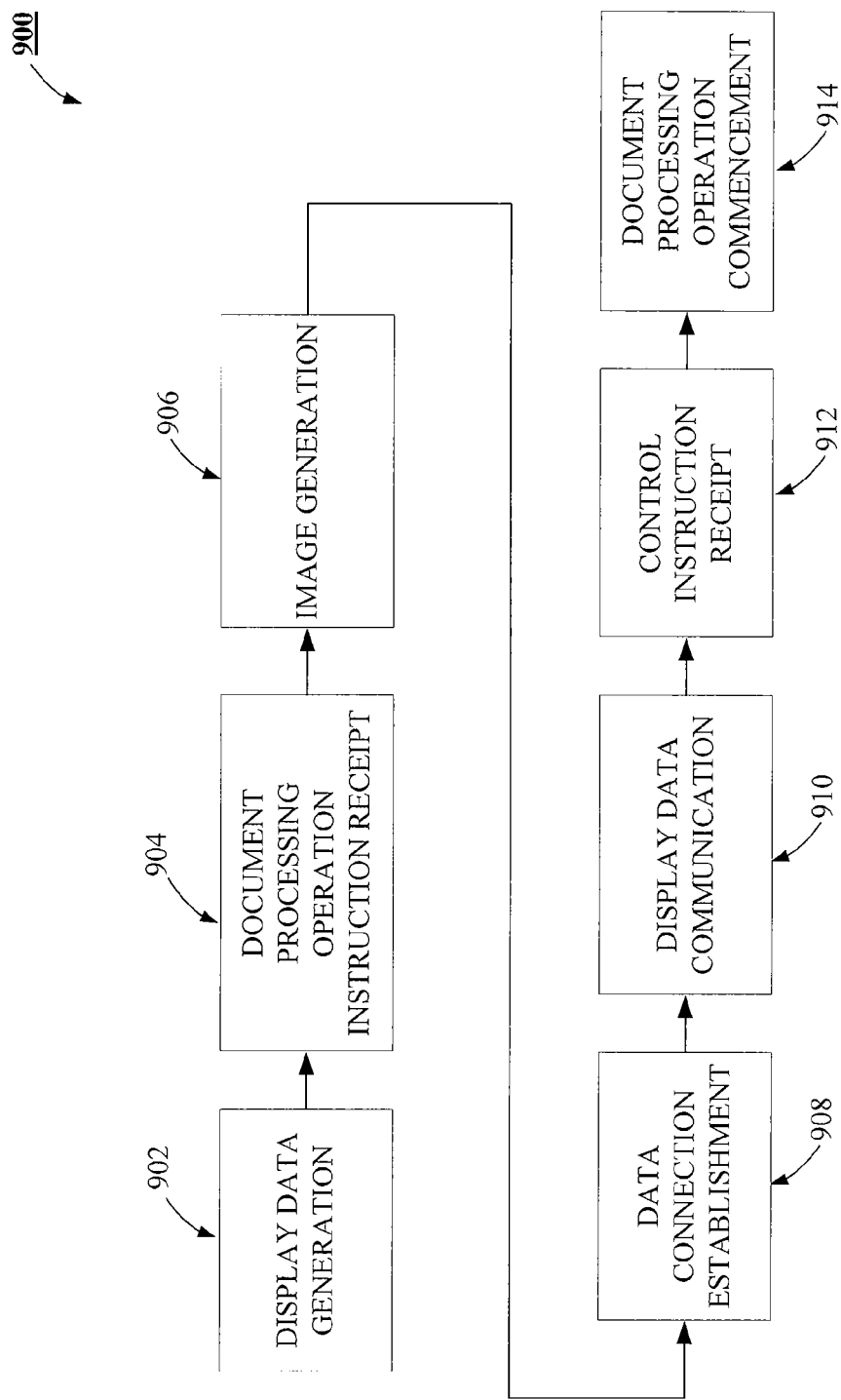
FIG. 9 is a functional diagram illustrating the system for controlling a document processing device via a remote device interface according to one embodiment of the subject application.

Turning now to FIG. 9, illustrated is a functional diagram of a system 900 for controlling a document processing device via a remote device interface in accordance with one embodiment of the subject application. As shown in FIG. 9, display data generation 902 is first performed via a controller that has a processor and associated data storage. Preferably, the display data generation 902 corresponds to the control of the document processing device.

Document processing operation instruction receipt 904 then occurs of instructions from an associated user that correspond to at least one document processing operation corresponding to display data. Image generation 906 is then performed of an image on a display integrated in the document processing device based upon the display data and the received instructions. Data connection establishment 908 then occurs of a connection with an associated data processing device. The associated data processing device preferably includes a user data input and a user display.

Display data communication 910 is then performed of the display data to the associated data processing device. Control instruction receipt 912 then occurs of instructions from the associated data processing device, thereby enabling user control of a document processing operation. Document processing operation commencement 914 then occurs of a document processing operation in accordance with received instructions from the associated data processing device.

Figure 10:
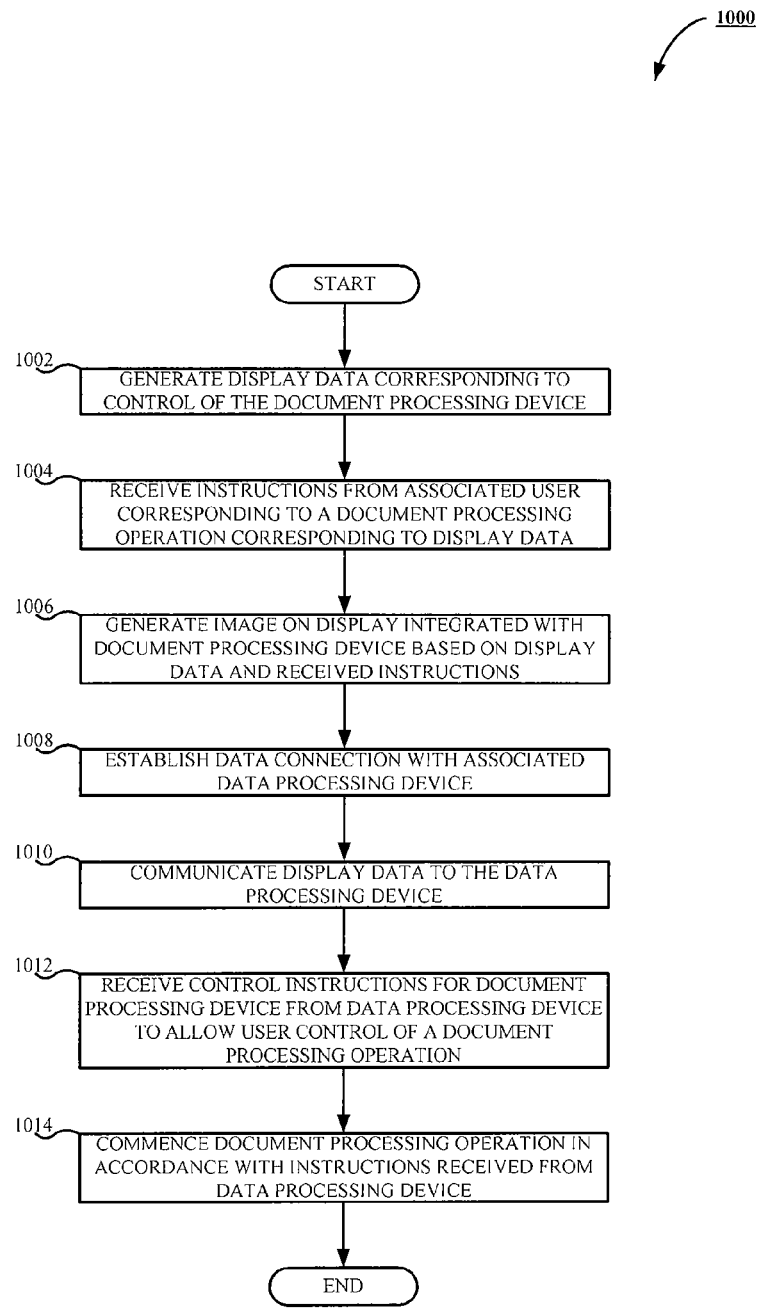
FIG. 10 is a flowchart illustrating a method for controlling a document processing device via a remote device interface according to one embodiment of the subject application.

The skilled artisan will appreciate that the subject system 100 and components described above with respect to FIG. 1, FIG. 2, FIG. 3, FIG. 4, FIG. 5, FIG. 6, FIG. 7, FIG. 8, and FIG. 9 will be better understood in conjunction with the methodologies described hereinafter with respect to FIG. 10 and FIG. 11, as well as the example illustrations of the embodiments depicted in FIG. 12. Turning now to FIG. 10, there is shown a flowchart 1000 illustrating a method of controlling a document processing device via a remote device interface in accordance with one embodiment of the subject application. Beginning at step 1002, display data, which corresponds to control of the document processing device, is generated via a controller that includes a processor and associated data storage.

At step 1004, instructions corresponding to one or more document processing operations corresponding to display data are received from an associated user corresponding to at least one document processing operation corresponding to display data. An image is then generated at step 1006 on a display that is integrated in the document processing device based upon the display data and the received instructions. At step 1008, a data connection is established with an associated data processing device that includes a user data input and a user display. The display data is then communicated, at step 1010, to the data processing device. At step 1012, control instructions for the document processing device are received from the associated data processing device so as to allow for user control of a document processing operation. A document processing operation is then commenced at step 1014 in accordance with received instructions from the associated data processing device.

Figure 11:
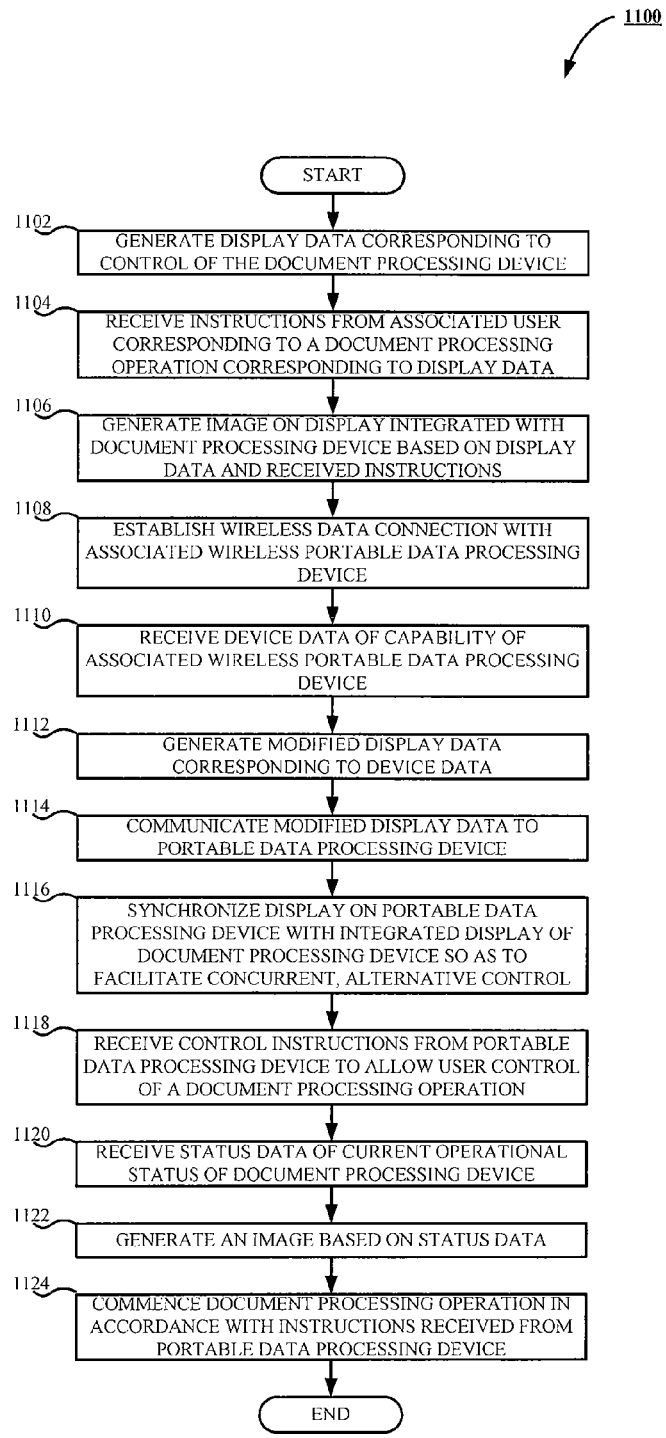
FIG. 11 is a flowchart illustrating a method for controlling a document processing device via a remote device interface according to one embodiment of the subject application.

Referring now to FIG. 11, there is depicted a flowchart 11 illustrating a method of controlling a document processing device via a remote device interface. Reference is made hereinafter to the data processing device being a wireless portable data processing device, e.g. a smart phone, web-enabled cellular telephone, proprietary communications device, or the like, including the portable devices 116 and 122 depicted in FIG. 1. It will be understood by those skilled in the art that such usage is for example purposes only, and the subject methodology is not limited to such devices. The methodology set forth in the example embodiment of FIG. 11 begins at step 1102, whereupon display data is generated by the controller 108 (which includes a processor and data storage as discussed with respect to FIG. 4 above). Preferably, the display data corresponds to the control of the document processing device 104, e.g. document processing operations, finishing options, login/logoff, and the like.

At step 1104, instructions are received from an associated user that correspond to a document processing operation with respect to the display data. It will be appreciated by those skilled in the art that such instructions are capable of being communicated from a remote device or input locally via the user interface 106 associated with the document processing device 104. An image is then generated on a display of the user interface 106 integrated with document processing device 104 at step 1106. According to one embodiment of the subject application, the image is generated on the display based upon the display data and the received instructions.

A wireless data connection is then established with an associated portable data processing device, e.g. the portable device 116 or 122 at step 1108. In accordance with one embodiment of the subject application, the portable device 116 and 122 include, for example and without limitation, a user data input, a user display, and the like. Using the established connection, device data representing the capabilities of the portable device 116 or 122 is then received by the controller 108 or other suitable component associated with the document processing device 104 at step 1110. It will be appreciated by those skilled in the art that suitable capability data includes, for example and without limitation, screen size, resolution, processing ability, storage, interface type, color, and the like.

At step 1112, modified display data is generated via the controller 108 or other suitable component associated with the document processing device 104 based upon the device capabilities indicated by the received device data. The modified display data is then communicated, via the wireless data connection, from the document processing device 104 to the portable data processing device 116 or 122 at step 1114. At step 1116, the display on the portable data processing device 116 or 122 and the display of the user interface 106 of the document processing device 104 are synchronized so as to facilitate concurrent, alternative control of the document processing device 104.

Figure 12:
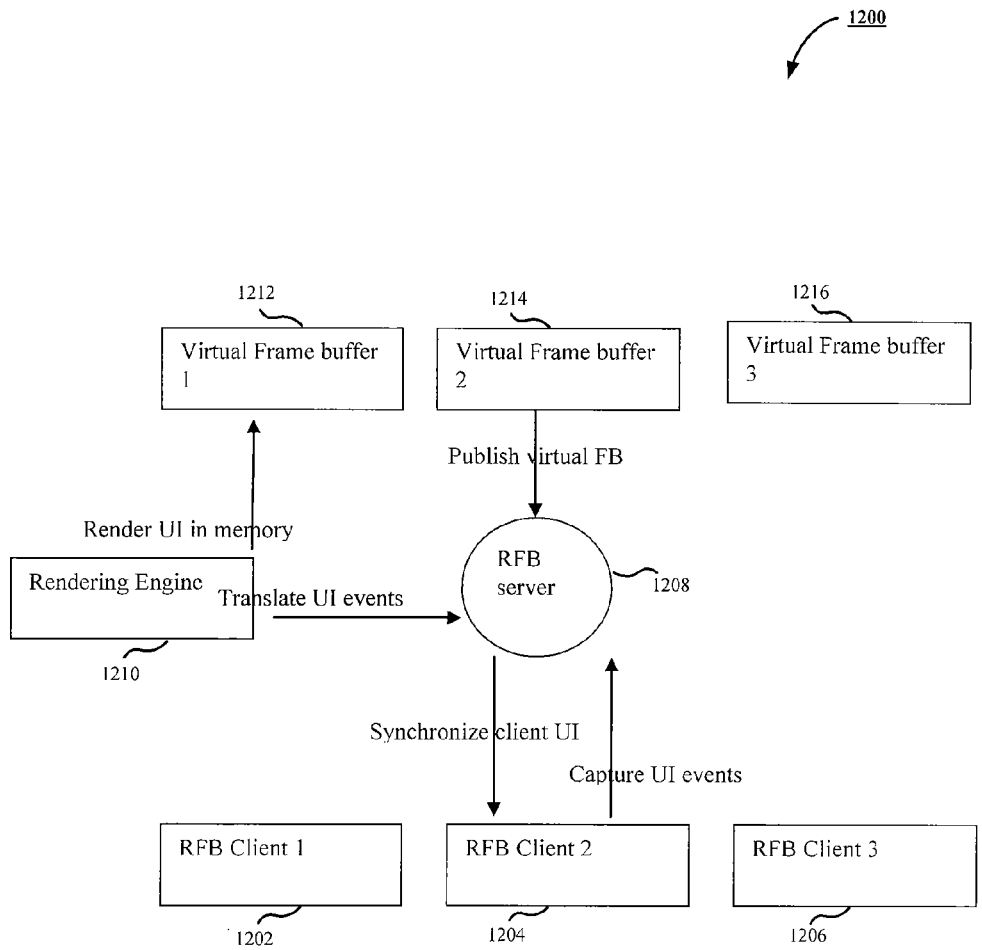
FIG. 12 is a block diagram illustrating one example implementation of the method for controlling a document processing device via a remote device interface in accordance with one embodiment of the subject application.

The relationship between the portable data processing devices 116 and 122 and the document processing device 104 will be better understood in conjunction with the diagram 1200 of FIG. 12. According to one embodiment of the subject application, the methodology of FIG. 11 employs a simple protocol, i.e. remote frame buffer, for remote access to the graphical user interface of the document processing device 104. FIG. 12 provides a suitable diagram 1200 illustrating the relationship between portable data devices 116 and 122, e.g.

the client devices 1202, 1204, and 1206 and the document processing device 104, e.g. the remote frame buffer server 1208. Thus, the portable data processing devices 116 and 122 are implemented as a remote frame buffer client (1202-1206) or viewer. The endpoint, e.g. the document processing device 104, wherein changes to the frame buffer originate is the remote frame buffer server (1208) of the methodology. In accordance with one embodiment of the subject application, the server 128 of FIG. 1 functions as the remote frame buffer server 1208, thereby freeing the controller 108 of the document processing device 104 for document processing operations. Accordingly, the rendering engine 1210 translates events on the user interface and renders the images into memory, i.e. the virtual frame buffer 1212, 1214, or 1216, which are then communicated back to the corresponding clients 1202-1206.

Returning to FIG. 11, control instructions are then received at step 1118 from the associated user via the portable data processing device 116 or 122. According to one embodiment of the subject application, the control instructions enable the user to control a document processing operation on the document processing device 104 via the portable data processing device 116 or 122. At step 1120, status data corresponding to the current operational status of the document processing device 104 is received by the portable data processing device 116 or 122. Preferably, the status data includes, for example and without limitation, paper levels, toner levels, print queue, jam status, processing availability, and the like. An image is then generated of based upon the status data at step 1122. A document processing operation is then commenced at step 1124 in accordance with instructions received from the portable data processing device 116 or 122.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A document processing device comprising:
   a controller, including a processor and associated data storage;
   a display data generator operable to generate display data corresponding to control of the document processing device;
   an input operable to receive instructions from an associated user corresponding to at least one document processing operation corresponding to display data;
   a user interface including an integrated display in the document processing device operable in conjunction with the display data and the input;
   a transceiver operable to establish a data connection with an associated data processing device including a user data input and a user display;
   the transceiver further operable to communicate the display data to the data processing device and to receive the instructions from the data processing device so as to allow for user control of a document processing operation via the associated data processing device alternatively to the user interface;
   a synchronizer operable to synchronize a display on the associated data processing device with the integrated display of the document processing device so as to facilitate concurrent, alternative control of the document processing device using either the display on the data processing device or the integrated display on the document processing device; and
   the controller operable to commence a document processing operation in accordance with received instructions from the associated data processing device.

2. The document processing device of claim 1 further comprising:
   a detector operable to receive device data corresponding to capability of the associated data processing device;
   wherein the controller is further operable to generate modified display data corresponding to the device data; and
   the transceiver is further operable to communicate the modified display data to the associated data processing device.

3. The document processing device of claim 2 wherein the transceiver is comprised of a wireless data transceiver, and the associated data processing device is comprised of a wireless portable data device.

4. The document processing device of claim 3 wherein the wireless portable data device is comprised of a smartphone.

5. The document processing device of claim 1 further comprising an input operable to receive status data corresponding to a current operational status of the document processing device, and wherein the display data includes the status data.

6. A method of controlling a document processing device via a remote device interface comprising:
   generating display data, via a controller which includes a processor and associated data storage, corresponding to control of the document processing device;
   receiving instructions from an associated user corresponding to at least one document processing operation corresponding to display data;
   generating an image on a display integrated in the document processing device in accordance with the display data and the received instructions;
   establishing a data connection with an associated data processing device including a user data input and a user display;
   communicating the display data to the data processing device;
   receiving control instructions for document processing device from the associated data processing device so as to allow for user control of a document processing operation;
   synchronizing a display on the associated data processing device with the integrated display of the document processing device so as to facilitate concurrent, alternative control of the document processing device using either the display on the data processing device or the integrated display on the document processing device; and
   commencing a document processing operation in accordance with received instructions from the associated data processing device.

7. The method of claim 6 further comprising:
   receiving device data corresponding to capability of the associated data processing device;
   generating modified display data corresponding to the device data; and communicating the modified display data to the associated data processing device.

8. The method of claim 7 wherein the data connection is established via a wireless data transceiver and the associated data processing device is comprised of a wireless portable data device.

9. The method of claim 8 wherein the wireless portable data device is comprised of a smartphone.

10. The method of claim 6 further comprising: receiving status data corresponding to a current operational status of the document processing device; and generating an image in accordance with the status data.

11. A system of controlling a document processing device via a remote device interface comprising:

means adapted for generating display data, via a controller which includes a processor and associated data storage, corresponding to control of the document processing device;

means adapted for receiving instructions from an associated user corresponding to at least one document processing operation corresponding to display data; means adapted for generating an image on a display integrated in the document processing device in accordance with the display data and the received instructions;

means adapted for establishing a data connection with an associated data processing device including a user data input and a user display; means adapted for communicating the display data to the data processing device;

means adapted for receiving control instructions for document processing device from the associated data processing device so as to allow for user control of a document processing operation;

means for synchronizing a display on the associated data processing device with the integrated display of the document processing device so as to facilitate concurrent, alternative control of the document processing device using either the display on the data processing device or the integrated display on the document processing device; and means adapted for commencing a document processing operation in accordance with received instructions from the associated data processing device.

12. The system of claim 11 further comprising:

means adapted for receiving device data corresponding to capability of the associated data processing device;

means adapted for generating modified display data corresponding to the device data; and means adapted for communicating the modified display data to the associated data processing device.

13. The system of claim 11 further comprising: means adapted for receiving status data corresponding to a current operational status of the document processing device; and means adapted for generating an image in accordance with the status data.

14. The system of claim 11 wherein the means adapted for establishing a data connection further comprises a wireless data transceiver, and the associated data processing device is comprised of a wireless portable data device.

15. The system of claim 14 wherein the wireless portable data device is comprised of a smartphone.

* * * * *